(12) United States Patent
Grosswald et al.

(10) Patent No.: US 9,429,212 B2
(45) Date of Patent: Aug. 30, 2016

(54) AXLE DEVICE FOR WORKING MACHINES WITH AT LEAST ONE AXLE CENTER TRANSMISSION

(71) Applicant: ZF Friedrichshafen AG, Friedrichshafen (DE)

(72) Inventors: Thomas Grosswald, Tiefenbach (DE); Enrico Herfurth, Passau (DE); Erich Katzensteiner, Pentling (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 307 days.

(21) Appl. No.: 13/867,197

(22) Filed: Apr. 22, 2013

(65) Prior Publication Data

US 2013/0283951 A1    Oct. 31, 2013

(30) Foreign Application Priority Data

Apr. 27, 2012 (DE) .......................... 10 2012 207 135

(51) Int. Cl.
*F16H 1/14*     (2006.01)
*B60K 17/36*    (2006.01)

(52) U.S. Cl.
CPC .................. *F16H 1/14* (2013.01); *B60K 17/36* (2013.01); *Y10T 74/19665* (2015.01)

(58) Field of Classification Search
CPC .... F16H 1/14; B60K 17/36; Y10T 74/19665
USPC ...................................... 180/371, 24.09, 24.1
See application file for complete search history.

(56) References Cited

U.S. PATENT DOCUMENTS

| | | | | |
|---|---|---|---|---|
| 2,870,853 A * | 1/1959 | Keese | .......................... | 180/24.09 |
| 2,870,854 A * | 1/1959 | Keese | .......................... | 180/24.09 |
| 2,915,920 A * | 12/1959 | Keese et al. | .................. | 475/206 |
| 3,000,456 A * | 9/1961 | Christie | ....................... | 180/24.09 |
| 3,146,842 A * | 9/1964 | Nelson et al. | .............. | 180/24.09 |
| 3,324,965 A | 6/1967 | Koch et al. | | |
| 3,780,821 A * | 12/1973 | Prange | ........................... | 180/250 |
| 4,840,089 A * | 6/1989 | Williamson | ................... | 475/184 |
| 4,883,138 A * | 11/1989 | Kameda et al. | .............. | 180/249 |
| 5,913,938 A * | 6/1999 | Brooks | ........................... | 74/417 |
| 5,950,750 A * | 9/1999 | Dong et al. | ................. | 180/24.09 |
| 6,514,169 B2* | 2/2003 | Turner et al. | ................. | 475/222 |
| 7,690,449 B2* | 4/2010 | Slesinski et al. | .......... | 180/24.09 |
| 2002/0029647 A1* | 3/2002 | Brooks | ........................... | 74/424 |
| 2002/0040613 A1* | 4/2002 | Brooks | ........................... | 74/423 |
| 2003/0190992 A1* | 10/2003 | Holman et al. | ............... | 475/221 |
| 2004/0089484 A1 | 5/2004 | Oates | | |
| 2006/0272866 A1 | 12/2006 | Ziech | | |

FOREIGN PATENT DOCUMENTS

| | | |
|---|---|---|
| DE | 1 455 909 | 8/1969 |
| WO | 85/01091 A1 | 3/1985 |
| WO | 2005/047044 A1 | 5/2005 |

OTHER PUBLICATIONS

German Search Report Corresponding to 10 2012 207 135.0.

* cited by examiner

*Primary Examiner* — Darlene P Condra
(74) *Attorney, Agent, or Firm* — Davis & Bujold, P.L.L.C.; Michael J. Bujold

(57) ABSTRACT

An axle arrangement for a working machine with at least one drive-through axle. The drive-through axle comprises a crown bevel gear (111), a pinion gear (112) and an output shaft (104) for driving a further axle. The crown bevel gear (111), the pinion gear (112) and the output shaft (104) are surrounded by a housing (103) and the output shaft (104) is arranged coaxially with the pinion gear (112).

15 Claims, 1 Drawing Sheet

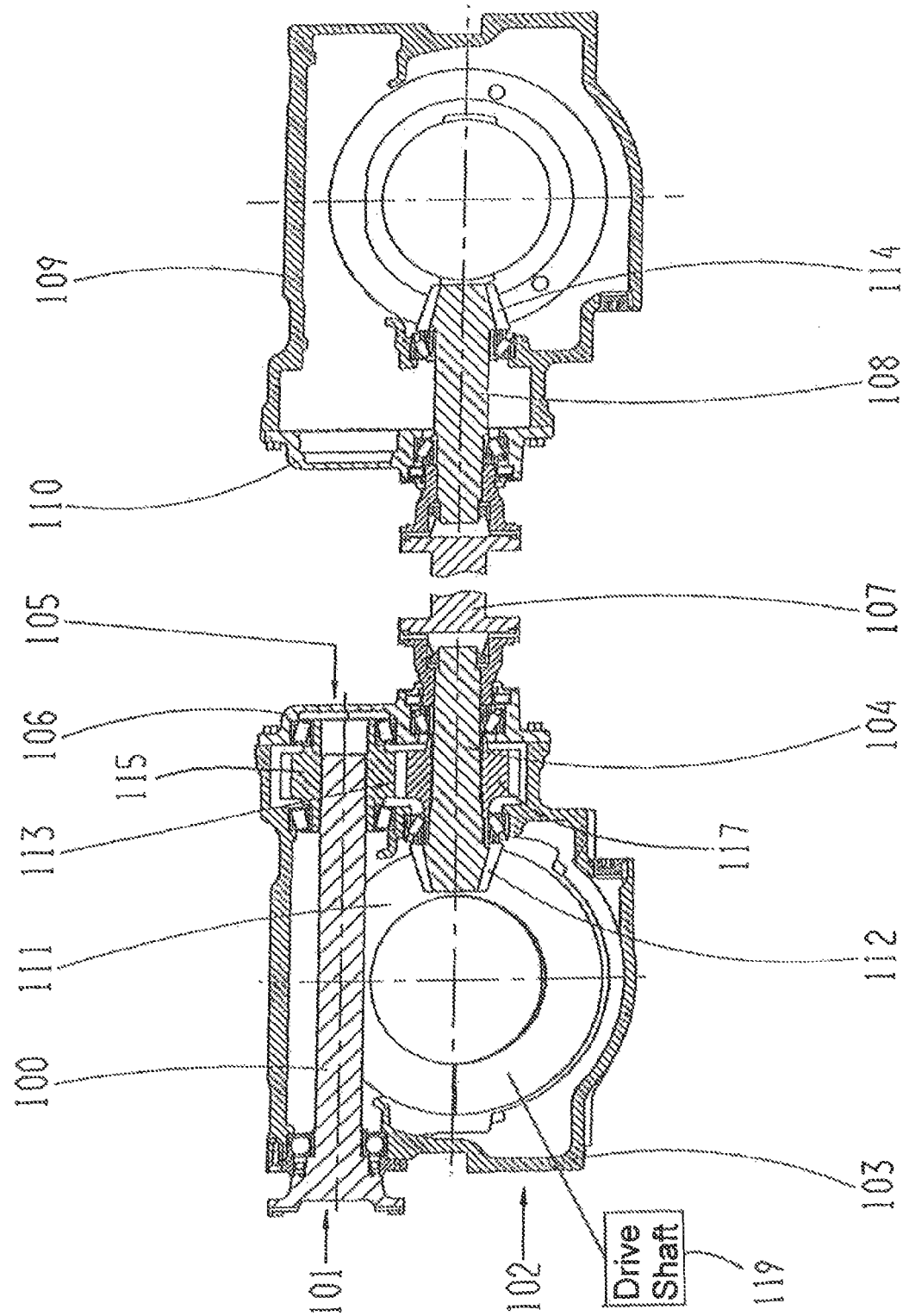

AXLE DEVICE FOR WORKING MACHINES WITH AT LEAST ONE AXLE CENTER TRANSMISSION

This application claims priority from German patent application serial no. 10 2012 207 135.0 filed Apr. 27, 2012.

FIELD OF THE INVENTION

The present invention concerns an axle arrangement for working machines with at least one drive-through axle, as used in working machines having a plurality of driven rear axles, namely so-termed tandem axles.

BACKGROUND OF THE INVENTION

It is known that by means of appropriate shaft arrangements and using spur gear systems, a plurality of adjacent axles, for example in a tandem axle arrangement, can be driven from a single power source.

DE 1 455 909 discloses a tandem axle drive arrangement of the type found for example in road vehicles with a tandem axle arrangement having a number of driven axles. In that context a tandem axle consists of a drive-through axle and a rear axle. An input shaft transmits the torque to the drive-through axle, where it is divided by means of a spur gear drive. Connected to the latter is a pinion gear shaft which drives a crown bevel gear in the drive-through axle. The pinion shaft is positioned under the input shaft in the housing. The spur gear drive is arranged on the side of the drive-through axle opposite the input shaft, i.e. behind the latter in the driving direction. At the same level as the input shaft there is an output shaft which, by way of a connecting element, transmits the rotational movement to a further input shaft, of the rear axle. On the side of the rear axle opposite the further input shaft there is another spur gear drive which drives a pinion gear positioned under the input shaft. This pinion gear transmits rotational movement to a further crown bevel gear, which is located inside the rear axle housing.

SUMMARY OF THE INVENTION

The purpose of the present invention is to provide an axle arrangement for working machines with at least one drive-through axle, such that the weight is reduced and the efficiency of the axle arrangement should be improved. Furthermore, it is desired to reduce the number of components and consequently to achieve savings of material, production and assembly costs. Among other things this increases the availability and reliability of the axle arrangement, which also improves economy during operation, which is also part of what the invention aims to achieve.

The set objective is achieved with an axle arrangement having a drive-through axle that comprises a crown bevel gear, a pinion gear and an output shaft for driving a further axle. The crown bevel gear engages with the pinion gear, whereas the latter is connected in a rotationally fixed manner to the output shaft. The crown bevel gear, the pinion gear and the output shaft are surrounded by a housing. Moreover, the output shaft and the pinion gear are arranged coaxially with one another.

In a preferred embodiment, the drive-through axle comprises an input shaft arranged a distance away from the output shaft in the housing. Particularly preferably, the input shaft and the output shaft are arranged parallel to one another. Preferably, in the fitted position the input shaft is above the output shaft. However, an arrangement with the input shaft under or at the same level as the output shaft is also conceivable. Basically, a non-parallel arrangement of the input shaft relative to the output shaft is also possible.

In a particularly preferred embodiment, the drive-through axle has a spur gear drive by which rotational movement can be transmitted from the input shaft to the output shaft. A reverse transmission of rotational movement, i.e. from the output shaft to the input shaft as occurs for example during thrust operation is also entirely possible. The spur gear drive is preferably arranged in the housing.

A spur gear drive is a one-step or multi-step spur gear transmission with at least two spur gears engaged with one another. In such an arrangement the respective shafts of the spur gears are parallel to one another.

In a further preferred embodiment, an input shaft on a first side of the housing projects with a first end out of the housing. Also preferably, a spur gear drive and the output shaft are arranged on a second side of the housing, this second side of the housing being opposite the first side of the housing.

In a preferred design, the output shaft of the drive-through axle can be connected by means of a connecting element to a further input shaft of an additional axle. The additional axle also preferably comprises a further pinion gear and a further crown bevel gear. The further crown bevel gear can be driven by the further pinion gear. Particularly preferably, in the fitted position the further pinion gear of the additional axle, the further input shaft of that axle and the output shaft of the drive-though axle, as well as the pinion gear of the drive-through axle, are arranged in the same plane. In a particularly preferred embodiment, the rotational axes of the crown bevel gear and of the output shaft intersect at a common intersection point. Particularly preferably, the rotational axis of the further input shaft and the rotation axis of the further crown bevel gear meet at another intersection point. Particularly preferably, the intersection point and the other intersection point are also located in one plane. In other preferred example embodiments, an arrangement in which the rotational axis of the output shaft is offset relative to the rotational axis of the crown bevel gear is conceivable, but in such a case, a more complex gearing design for the engagement between the pinion gear and the crown bevel gear is absolutely necessary, for example in the form of hypoid gearing.

A rotational axis is understood to be an axis about which the rotation of a component takes place. Particularly preferably, the rotational axis corresponds to the symmetry axis of the component concerned. This implies that the component has a rotationally symmetrical design.

In a further, particularly preferred embodiment, the housing is closed on the second side by a housing cover. Particularly preferably the housing cover has at least one opening, for example to allow passage of the output shaft. Furthermore, this arrangement ensures better accessibility for example during assembly or in the case of maintenance or servicing work. At the same time the number of variants is reduced thereby since for different applications it is only necessary to fix a corresponding housing cover onto the housing, whereas the housing itself is in each case designed in the same way.

In a particularly preferred design, the further input shaft of the further axle is surrounded by a further housing. Particularly preferably, on one side, the side on which the further input shaft can be connected to the output shaft, the further housing is closed by a further housing cover. Particularly preferably, the use of this further housing cover enables a modular structure of the further axle, since depending on the application the same housing variant can be combined with a variety of housing covers. Moreover, particularly preferably this arrangement facilitates assembly and maintenance or servicing work.

In a further, particularly preferred embodiment form, the housing and the further housing have the same contour. Likewise, particularly preferably the housing cover and the further housing cover also have the same contour. They are then preferably arranged so that in the fitted condition the housing cover and the further housing cover face toward one another. This enables the same housing type to be used for the drive-through axle and for the further axle. The further axle is particularly preferably the rear axle. At the same time, the further axle is particularly preferably suitable for use as the front axle. In the latter case the front axle must be arranged so that the further housing cover faces toward the first side of the housing of the drive-through axle. It is also preferable for any unnecessary openings in the housing or the further housing to be closed off, for example by means of a screw-in plug or a new housing cover.

BRIEF DESCRIPTION OF THE DRAWINGS

A preferred embodiment of the invention is explained in more detail with reference to the attached sole drawing, which shows a sectioned view of an axle arrangement for working machines with at least one drive-through axle.

DETAILED DESCRIPTION OF THE PREFERRED EMBODIMENTS

The figure shows a sectional view of an input shaft 100, a first end 101 of which projects, on a first side 102 of a (first) housing 103, out of the housing. The input shaft 100 is mounted and able to rotate in the housing 103. By way of a spur gear drive 113, rotational movement is transmitted from the input shaft 100 to an output shaft 104. The output shaft 104 is also mounted to rotate in the housing 103. The input shaft 100 and the output shaft 104 are positioned a distance apart, but extend parallel to one another. The spur gear drive 113 is located in the area of a second side 105 of the housing 103, and comprises spur gears 115 and 117. The second side 105 of the housing 103 is opposite the first side 102 of the housing 103. On the second side 105 of the housing, the housing 103 is closed by a housing cover 106.

The output shaft 104 is connected in a rotationally fixed manner to a pinion gear 112, which engages with a crown bevel gear 111. The pinion gear 112 and the crown bevel gear 111 are surrounded by the housing 103. The output shaft 104 projects on the second side 105 out of the housing 103 or its housing cover 106. By means of a connecting element 107 the output shaft 104 can be connected to a further input shaft 108. At its end facing toward the connecting element 107, the further input shaft 108 projects out of a further housing 109. At the end of the further input shaft 108 located inside the further (second) housing 109, the shaft is connected rotationally fixed to a further pinion gear 114. The further input shaft 108 is mounted to rotate in the further housing 109. On the side of the further housing 109 on which the further input shaft 108 can be connected to the connecting element 107, the further housing 109 is closed by a further housing cover 110. The end of the further input shaft 108 that is surrounded by the further housing 109 is connected in a rotationally fixed manner to a further pinion gear 114 which engages with a further crown bevel gear (not shown in FIG. 1). The crown bevel gear is arranged parallel to and offset from the plane of the crown bevel gear 111.

The output shaft 104 and the further input shaft 108 are arranged coaxially with one another. Moreover, the output shaft 104, the connecting element 107 and the further input shaft 108 are located in the same plane as the rotational axis of the crown bevel gear 111 and the rotational axis of the further crown bevel gear. The rotational axis of the crown bevel gear 111 and that of the further crown bevel gear are arranged coaxially with the driveshafts. The driveshafts 119 (diagrammatically shown) transmit the rotational movements of the crown bevel gear 111 and the further crown bevel gear to the wheels of the vehicle, and thereby propel it.

The housing 103 and the further housing 109 have the same contour, and the further housing 109 is arranged in such manner that the further housing cover 110 faces toward the housing cover 106.

INDEXES

101 First end
102 First side
103 Housing
104 Output shaft
105 Second side
106 Housing cover
107 Connecting element
108 Further input shaft
109 Further housing
110 Further housing cover
111 Crown bevel gear
112 Pinion gear
113 Spur gear drive
114 Further pinion gear

The invention claimed is:

1. An axle arrangement for a working machine with at least one drive-through axle, the drive-through axle comprising:
    a crown bevel gear (111) for driving a drive shaft,
    a pinion gear (112),
    an output shaft (104) for driving a further axle and the output shaft (104) supporting the pinion gear (112),
    the crown bevel gear (111), the pinion gear (112) and the output shaft (104) being located within and surrounded by a first housing (103),
    the crown bevel gear forming a first drive output of the first housing and the output shaft forming a second drive output of the first housing, and
    the output shaft (104) being arranged coaxially with the pinion gear (112).

2. The axle arrangement for a working machine with at least one drive-through axle according to claim 1, wherein an input shaft (100) is arranged, in the first housing (103), parallel to the output shaft (104).

3. The axle arrangement for a working machine with at least one drive-through axle according to claim 2, wherein rotational movement is directly transmittable, by way of a spur gear drive (113), either from the input shaft (100) to the output shaft (104) or from the output shaft (104) to the input shaft (100), and the spur gear drive (113) is located inside the first housing (103).

4. The axle arrangement for a working machine with at least one drive-through axle according to claim 1, wherein a first end (101) of an input shaft (100) projects out of a first side (102) of the first housing (103) and, on a second side (105) of the first housing (103) opposite the first side (102), a spur gear drive (113) and the output shaft (104) are arranged, and the input shaft and the output shaft are parallel to each other.

5. The axle arrangement for a working machine with at least one drive-through axle according to claim 4, wherein the second side (105) of the first housing (103) is covered by a housing cover (106).

6. The axle arrangement for a working machine with at least one drive-through axle according to claim 1, wherein a connecting element (107) connects the output shaft (104) to a further input shaft (108) of the further axle, such that, in an installed condition, a further pinion gear (114) of the further axle, the further input shaft (108) of the further axle and the output shaft (104) of the drive-through axle as well as the pinion gear (112) of the drive-through axle are arranged coaxially, and a further crown bevel gear of the further axle is drivable by the further pinion gear (114).

7. The axle arrangement for a working machine with at least one drive-through axle according to claim 6, wherein the further input shaft (108) of the further axle is surrounded by a further housing (109) and, on a side on which the further input shaft (108) is connectable by the connecting element (107) to the output shaft (104), the further housing is closed by a further housing cover (110).

8. The axle arrangement for a working machine with at least one drive-through axle according to claim 1, wherein the crown bevel gear (111) defines a first rotational axis and the output shaft (104) and the pinion gear (112) define a second rotational axis, the first rotational axis and the second rotational axis define a plane.

9. The axle arrangement for a working machine with at least one drive-through axle according to claim 1, wherein an input shaft is supported within the first housing (103), the input shaft supports a first gear that directly engages a second gear, and the second gear is supported by the output shaft (104).

10. The axle arrangement for a working machine with at least one drive-through axle according to claim 1, wherein the first housing (103) has first and second sides that are opposite from each other, a first axial end of an input shaft is supported by the first side of the first housing (103) and an opposite second axial end of the input shaft is supported by the second side of the first housing (103).

11. The axle arrangement for a working machine with at least one drive-through axle according to claim 10, wherein the pinion gear (112) is rotationally fixed to the output shaft (104), and the second axial end of the input shaft has a first gear that meshes with a second gear, the second gear is supported on the output shaft (104).

12. The axle arrangement for a working machine with at least one drive-through axle according to claim 1, wherein the output shaft (104) is connected, via a connecting element, to an input shaft of a second housing (109), such that the pinion gear (112), the output shaft (104) and the input shaft of the second housing (109) are coaxially aligned with each other.

13. An axle arrangement for a working machine with at least one drive-through axle, the drive-through axle comprising:
   a crown bevel gear (111),
   a pinion gear (112),
   an output shaft (104) for driving a further axle,
   the crown bevel gear (111), the pinion gear (112) and the output shaft (104) being surrounded by a first housing (103),
   the output shaft (104) being arranged coaxially with the pinion gear (112);
   a connecting element (107) connects the output shaft (104) to a further input shaft (108) of a further axle, such that, in an installed condition, a further pinion gear (114) of the further axle, the further input shaft (108) of the further axle and the output shaft (104) of the drive-through axle as well as the pinion gear (112) of the drive-through axle are arranged in a common plane, and a further crown bevel gear is drivable by the further pinion gear (114);
   the further input shaft (108) of the further axle is surrounded by a further housing (109) and, on a side on which the further input shaft (108) is connectable by the connecting element (107) to the output shaft (104), the further housing is closed by a further housing cover (110); and
   the first housing (103) and the further housing (109) each have a same contour, and the housing cover (106) and the further housing cover (110) each have a same contour and are arranged so that, in an installed condition, the housing cover (106) and the further housing cover (110) face toward one another.

14. An axle arrangement for a working machine having a drive-through axle, the axle arrangement comprising:
   a first housing supporting a first input shaft such that one end of the first input shaft extends through an input side of the first housing, and an opposite end of the first input shaft engaging with a spur gear and being supported within the first housing such that the first input shaft rotating about a first rotational axis;
   an output shaft being supported by the first housing with an output end of the output shaft extending through a housing cover enclosing an output side of the first housing, the input and the output sides of the first housing being opposite each other, an end of the output shaft, opposite the output end thereof, comprising a pinion gear engaging with a first crown bevel gear, and the output shaft engaging another spur gear such that the spur gear of the first input shaft rotationally drives the spur gear of the output shaft;
   a second housing supporting a second input shaft, one end of the second input shaft comprising a pinion gear and an opposite end of the second input shaft extending through a housing cover enclosing an input side of the second housing, the pinion gear of the second input shaft engaging with a second crown bevel gear, and the output end of the output shaft being connected, via a connecting element, to the opposite end of the second input shaft; and
   the first housing and the second housing being aligned with respect to one another such that the output shaft, the connecting element, and the second input shaft being coaxial and rotate about a common rotational axis, and the first and the second crown bevel gears each rotating about a respective rotational axis, the rotational axes of the first and the second crown bevel gears and the common rotational axis of the output shaft, the connecting element, and the second input shaft defining a plane, and the rotational axis of the first input shaft being parallel to the common rotational axis.

15. The axle arrangement for a working machine according to claim 14, wherein the first housing and the second housing each have a same contour, and are arranged with respect to one another such that the output side of the first housing faces the input side of the second housing, the housing cover of the first housing and the housing cover of the second housing have a same contour.

* * * * *